United States Patent [19]
MacDonald

[11] Patent Number: 5,784,627
[45] Date of Patent: Jul. 21, 1998

[54] INTEGRATED TIMER FOR POWER MANAGEMENT AND WATCHDOG FUNCTIONS

[75] Inventor: James R. MacDonald, Buda, Tex.

[73] Assignee: Advanced Micro Devices, Inc., Sunnyvale, Calif.

[21] Appl. No.: 590,967

[22] Filed: Jan. 24, 1996

[51] Int. Cl.$^6$ .................................................. G06F 1/32
[52] U.S. Cl. .................................................. 395/750.01
[58] Field of Search .............................. 395/750, 750.01; 377/34, 39, 98, 16

[56] References Cited

U.S. PATENT DOCUMENTS

| | | | |
|---|---|---|---|
| 4,939,755 | 7/1990 | Akita et al. | 377/39 |
| 4,942,522 | 7/1990 | Wilkie et al. | 395/750 |
| 5,448,606 | 9/1995 | Snelgrove | 377/34 |
| 5,454,018 | 9/1995 | Hopkins | 377/28 |
| 5,461,649 | 10/1995 | Bailey et al. | 327/28 |
| 5,469,553 | 11/1995 | Patrick | 395/750 |
| 5,504,910 | 4/1996 | Wisor et al. | 395/750 |
| 5,511,203 | 4/1996 | Wisor et al. | 395/750 |
| 5,564,015 | 10/1996 | Bunnell | 395/184.01 |

*Primary Examiner*—Ayaz R. Sheikh
*Assistant Examiner*—David A. Wiley
*Attorney, Agent, or Firm*—Skjerven, Morrill, MacPherson, Franklin & Friel, LLP; David W. O'Brien

[57] ABSTRACT

A variety of clock intensive functions, such as interval timers, real-time clocks, and resettable timers for triggering watchdog reset and power management mode transitions, are provided using a single counter and timer event control logic. Such an integrated timer provides multiple time-based event signals from a single sequence of states. The integrated timer circuit includes sequential logic with a plurality of bit outputs, first and second configuration registers, and timer event control logic. The sequential logic supplies a sequence of states at the bit outputs in response to a clock signal. Variations of the sequential logic include a free-running binary counter, ripple counter, or gray code counter. State detection logic is coupled to the bit outputs of the sequential logic and coupled to the first and second configuration registers to receive first and second event descriptors. When the bit outputs of the sequential logic correspond to the first event descriptor, the state detection logic supplies a first state detection signal. When the bit outputs of the sequential logic correspond to the second event descriptor, the state detection logic supplies a second state detection signal. Masking logic selectively masks a first count of successive first state detection signals and supplies the first event signal in response to a subsequent one of the first state detection signals. The masking logic also selectively masks a second count of successive second state detection signals and supplies the second event signal in response to a subsequent one of the second state detection signals.

19 Claims, 4 Drawing Sheets

INTEGRATED TIMER FOR POWER MANAGEMENT AND WATCHDOG FUNCTIONS

BACKGROUND OF THE INVENTION

1. Field of the Invention

This invention relates to timers and, more particularly, to timers for power management functions.

2. Description of the Related Art

The power consumption of portable and embedded systems is important to system designers because it directly affects the length of time such a system may operate on a single charge. Furthermore, because energy storage subsystems (e.g., batteries) are often bulky and heavy, power consumption indirectly affects the overall size and weight of a portable or embedded system which has a particular time between charges as its design target. Even in embedded systems for which non-volatile energy sources (e.g., line current) are available, it may be desirable to minimize power consumption during periods of inactivity. Accordingly, the power consumption of each subsystem in a portable or embedded system can be of great concern.

Certain subsystems of a portable or embedded system can be "power managed" by gating the supply of clock signals to the subsystems. Such clock gating involves control over the clock signal received by individual subsystems during particular operational modes. For example, clock gating techniques may mask the clock signal supplied to a given subsystem or reduce the apparent frequency of the clock signal supplied thereto. This gating function is sometimes performed by a Power Management Unit (PMU). While the system is in a power conservation mode, the clocks to individual subsystems may be individually disabled or supplied at reduced frequency by the PMU. Unfortunately, clock gating is a less attractive technique for reducing the power consumption of those subsystems which include timer circuits that must operate continuously.

Clock gating can be an effective technique for power managing those subsystems of a computer system which need not operate continuously. However, clock gating is not an attractive technique for reducing the power consumption of those subsystems having timer circuits which must operate continuously. Interval timers and timer circuits for triggering a watchdog reset can be implemented as continuously operating counters. Similarly, a Power Management Unit (PMU) can incorporate or exploit continuously operating counter circuits for triggering transitions between power conservation modes. In the case of counter circuits implementing a watchdog reset or a power management transition timer, such counters will be periodically reset by software or hardware activity so as to stave off the corresponding watchdog reset or power management mode transition. If the corresponding counter reaches a predetermined value, the corresponding event is triggered.

For example, periodic disk access resetting a counter circuit may be used to implement a power down circuit for a fixed disk controller. Over a given interval, an absence of disk accesses will allow the counter to run down (or up) to a predetermined value thereby triggering a transition to another power management mode, e.g., standby mode. Using multiple counters, a variety of transitions between power management modes may be implemented for a variety of subsystems. Unfortunately, each such counter will typically be clocked at the operating frequency of the system (or at a near fraction thereof). The power dissipation associated with each such counter practically limits the number of counters which may be used to tailor power management levels to multiple subsystems. Counters associated with interval timers and watchdog reset circuits create similar power dissipation problems.

SUMMARY OF THE INVENTION

It has been discovered that a variety of clock intensive functions, such as interval timers, real-time clocks, and resettable timers for triggering watchdog reset and power management mode transitions, may be provided using a single counter and timer event control logic. Such an integrated timer provides multiple time-based event signals from a single sequence of states.

In one embodiment of the present invention, a timer circuit includes sequential logic with a plurality of bit outputs, first and second configuration registers, and timer event control logic. The sequential logic supplies a sequence of states at the bit outputs in response to a clock signal. Timer event control logic includes multiple inputs respectively coupled to the bit outputs of the sequential logic and includes first and second event outputs. The timer event control logic is coupled to the first and second configuration registers to receive first and second event descriptors selective for particular states in the sequence of states supplied at the bit outputs. When the first event descriptor matches the state supplied at the bit outputs, timer event control logic selectively supplies a first event signal at the first event output. When the second event descriptor matches the state supplied at the bit outputs, timer event control logic selectively supplies a second event signal at the second event output.

In a further embodiment, the sequential logic includes a free-running binary counter. In yet a further embodiment, the sequential logic includes a free-running ripple counter. In still yet a further embodiment, the sequential logic includes a free-running gray code counter.

In still yet a further embodiment, the timer event control logic includes state detection logic and masking logic. The state detection logic is coupled to the bit outputs of the sequential logic and coupled to the first and second configuration registers to receive the first and second event descriptors. When the bit outputs of the sequential logic correspond to the first event descriptor, the state detection logic supplies a first state detection signal. When the bit outputs of the sequential logic correspond to the second event descriptor, the state detection logic supplies a second state detection signal. The masking logic is coupled to the state detection logic to receive the first and second state detection signals. The masking logic selectively masks a first count of successive first state detection signals and then supplies the first event signal in response to a subsequent one of the first state detection signals. The masking logic also selectively masks a second count of successive second state detection signals and then supplies the second event signal in response to a subsequent one of the second state detection signals.

BRIEF DESCRIPTION OF THE DRAWINGS

The present invention may be better understood, and its numerous objects, features, and advantages made apparent to those skilled in the art by referencing the accompanying drawings.

FIGS. 1A and 1B are collectively referred to herein as FIG. 1.

The use of the same reference symbols in different figures indicates similar or identical items.

DETAILED DESCRIPTION OF THE PREFERRED EMBODIMENTS

The following sets forth a detailed description of the preferred embodiments. The description is intended to be illustrative of the invention and should not be taken to be limiting. Many variations, modifications, additions, and improvements may fall within the scope of the invention as defined in the claims which follow.

Figure 1A:
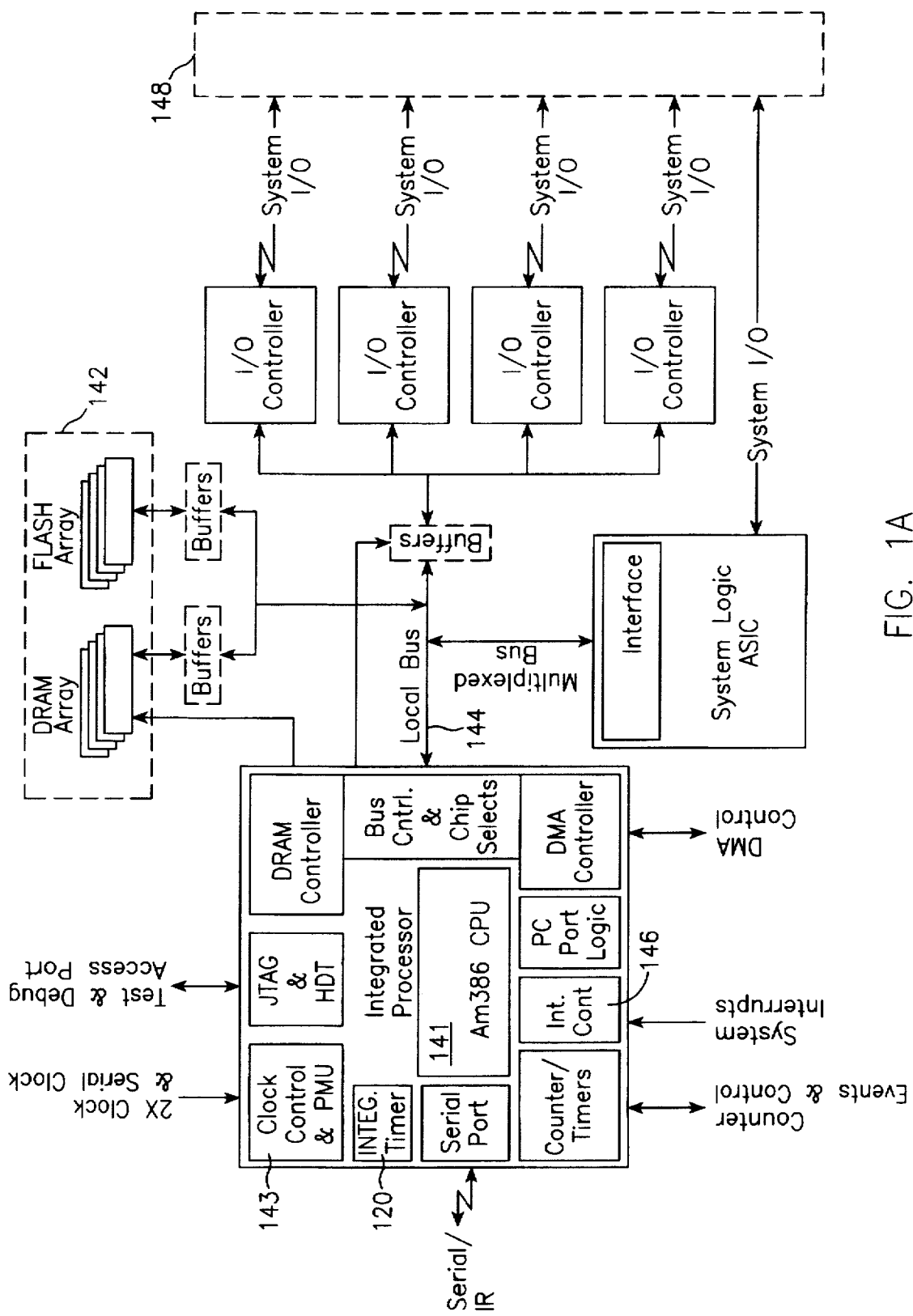
FIGS. 1A and 1B are system-level and internal block diagrams of a computer system incorporating an integrated timer circuit in accordance with the present invention.
Figure 1B:
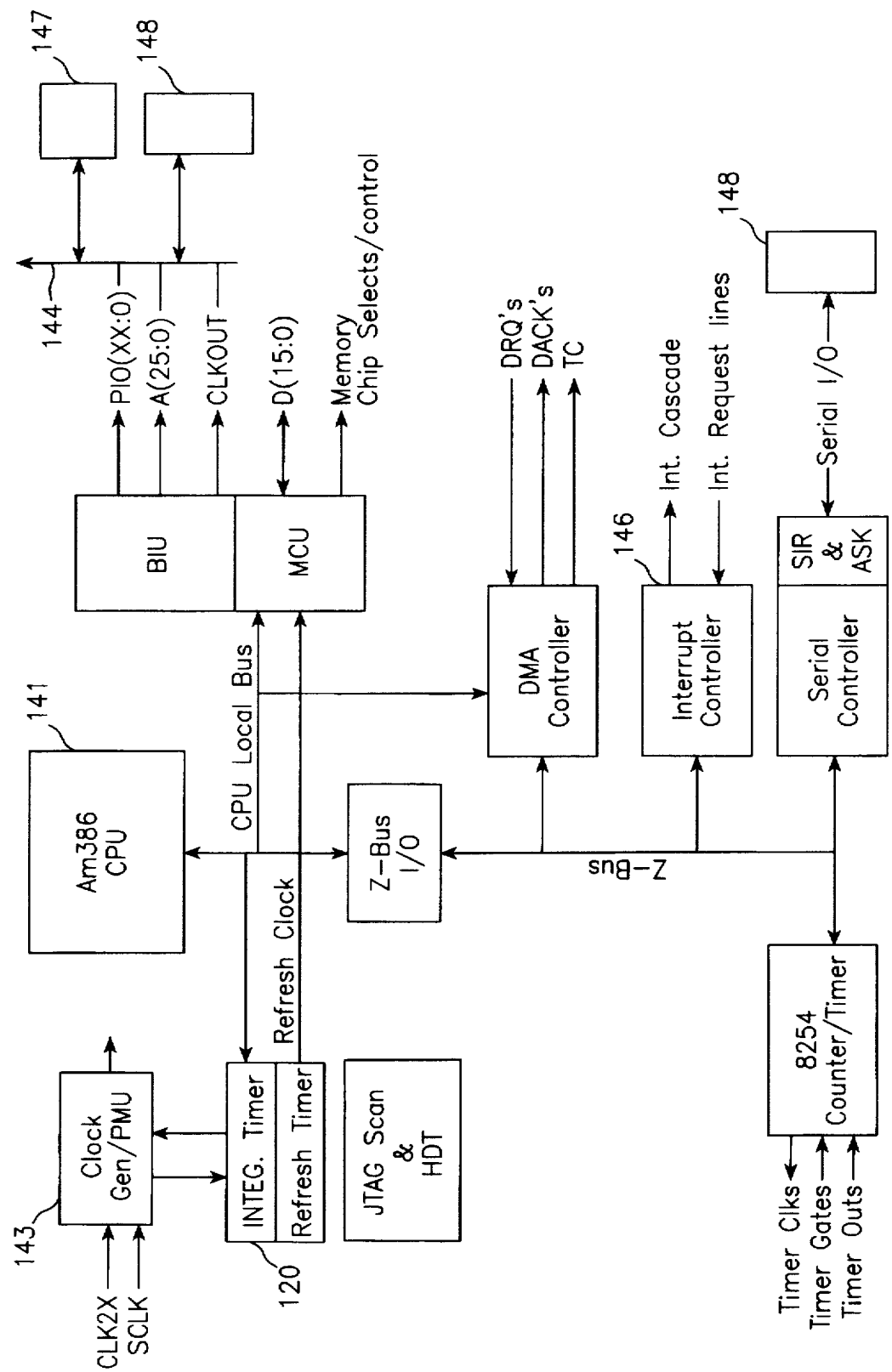

Referring to FIG. 1, an exemplary computer system 100 is shown with an integrated timer circuit 120. Computer system 100 includes a processor 141, memory 142, a power management unit 143, a system bus 144, a programmable interrupt controller 146, secondary storage devices 147, and input/output subsystems 148. Computer system 100 is illustrative of a processor system (e.g., a portable or embedded computer system) incorporating an integrated timer circuit 120. Alternative system configurations may eliminate from, substitute for, or add to the set of functional blocks shown in FIG. 1. Suitable modifications to, and variations on, computer system 100, in accordance with present invention, will be apparent to those skilled in the art. Functional blocks may also be merged. For example, integrated timer circuit 120 (or portions thereof) may be merged with power management unit 143, if desired.

In one embodiment of computer system 100, processor 141 includes a processor conforming to the x86 processor architecture such as the Am186EM embedded processor (available from Advanced Micro Devices, Inc., Sunnyvale, Calif.), although other processors would also be suitable. Processor 141 executes programs from memory 142 and reads and writes data from and to memory 142. Memory 142 may incorporate read/write (e.g., RAM) portions, read-only (e.g., ROM) portions, or both. Power management unit 143 controls the operating mode of the various subsystem of exemplary computer system 100, illustratively controlling the operating mode of processor 141, secondary storage devices 147, and input/output subsystems 148, in response to power management event signals supplied by integrated timer circuit 120. For example, integrated timer circuit 120 supplies event signals indicating transitions to low performance, sleep/doze, and full suspend power management modes which power management unit 143 implements by gating clock inputs to and/or shutting down individual power managed subsystems. Certain power management event signals may also trigger interrupt service routines (illustratively, via programmable interrupt controller 146) for handling power management mode transitions.

Figure 2:
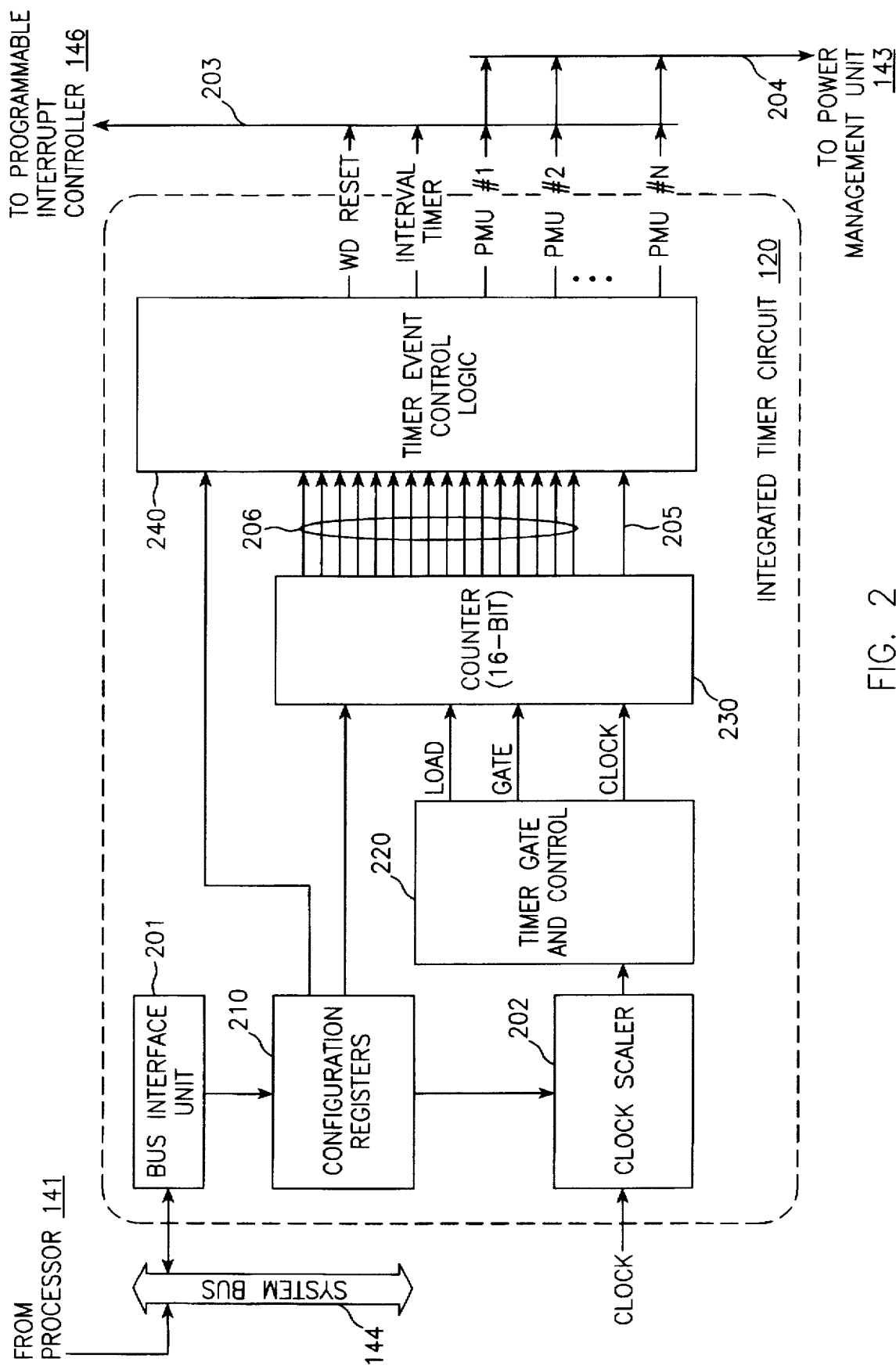
FIG. 2 is a functional block diagram of an integrated timer circuit for supplying power management and watchdog reset event signals in accordance with the present invention.

FIG. 2 depicts integrated timer circuit 120 in greater detail. Operating system software (or firmware) running on processor 141 supplies configuration data to configuration registers 210 of integrated timer circuit 120 via system bus 144 and bus interface unit 201. Based on such configuration data, timer event control logic 240 supplies a variety of time-based event signals (illustratively, a watchdog reset signal, an interval timer signal, and a series of power management event signals, PMU #1–PMU #M) which are derived from the sequence of states supplied by counter 230. Such time based event signals are supplied to power management unit 143 and/or to programmable interrupt controller 146. For example, in the embodiment of FIG. 2, watchdog reset signal and interval timer signal are supplied to programmable interrupt controller 146 via line 203. Power management event signals (e.g., PMU #1–PMU #N) are supplied to power management unit 143 via line 203 and to programmable interrupt controller 146 via line 204 if interrupt service routine support for power management mode transitions is desired. Alternate embodiments may provide for alternate distributions of event signals as well as for additional time-based event signals. Additionally, timer event control logic 240 may selectively distribute event signals based on configuration data stored in configuration registers 210. Suitable modifications for alternate and/or selective distribution of event signals will be apparent to those skilled in the art.

In the embodiment of FIG. 2, counter 230 includes a 16-bit binary counter, although alternative embodiments may include other sequential logic for supplying a sequence of states. For example, counter 230 may be a gray code counter or a ripple counter. A gray code counter may be attractive because of the reduced power dissipation associated with single bit state changes, although more complex detection logic would be required in timer event control logic 240. Those skilled in the art will appreciate the tradeoffs between designs for counter 230 and those for timer event control logic 240. Suitable variations on counter 230 may provide a larger or smaller number of bit outputs and may count up or down.

In each case, timer event control logic 240 receives bit outputs 206 from counter 230 and supplies event signals based on those bit outputs. For each event signal supported, timer event control logic 240 receives an event descriptor from configuration registers 210. Each such event descriptor identifies the particular counter state (or states) which trigger a corresponding event signal. For example, in the embodiment of FIG. 2, timer event control logic 240 receives event descriptors corresponding to a watchdog reset event, an interval timer event, and power management event signals (PMU #1–PMU #N) from configuration registers 210. As counter 230 sequences through a sequence of states, timer event control logic 240 detects, in accordance with the event descriptors, particular ones of the states supplied at bit outputs 206 of counter 230. Timer event control logic 240 selectively supplies event signals in response to matches between the counter states supplied at bit outputs 206 and the event descriptors. In the exemplary embodiment of FIG. 2, an additional output 205 encoding counter rollover (i.e., from all 1s to all 0s) is supplied from counter 230 to timer event control logic 240. In certain counter 230 configurations, e.g., a binary counter, the high order carry bit may be supplied to signify rollover, thereby simplifying detection of such a condition in timer event control logic 240.

Integrated timer circuit 120 also includes timer gate and control logic 220 and a clock scaler circuit 202 for manipulating the clock input to counter 230. In this way, the power dissipation of integrated timer circuit 120 may be reduced during periods of overall system inactivity. Event descriptors stored in configuration registers 210 should be adjusted to correspond to a reduced apparent clock frequency. In addition, timer gate and control logic 220 provides initial value load support for test and debugging.

Figure 3:
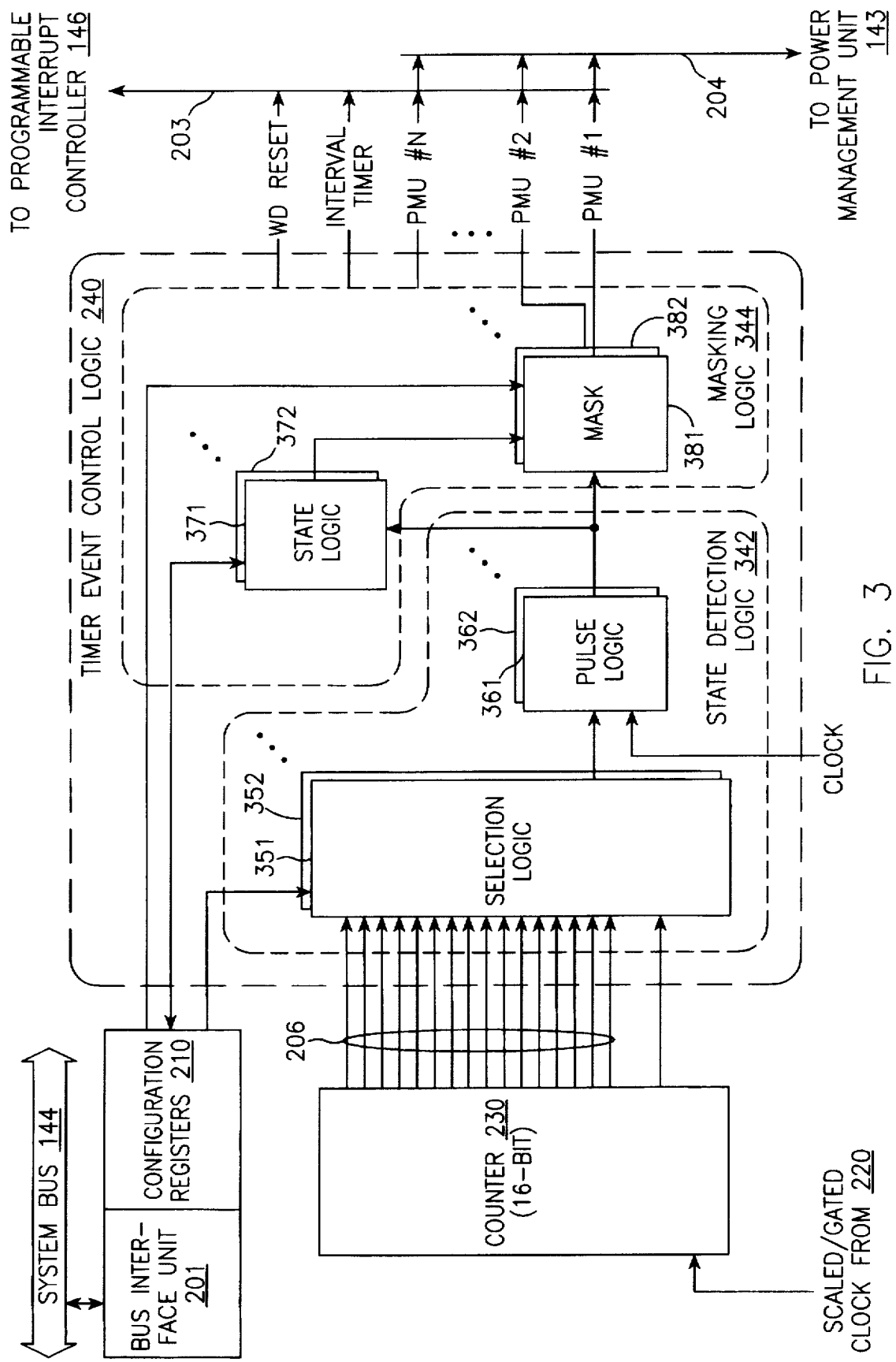
FIG. 3 is a functional block diagram of timer event control logic in accordance with the present invention.

Referring now to FIG. 3, timer event control logic 240 is illustratively presented as multiple instances of various component logic blocks, wherein each instance corresponds to a particular timer event. Collectively, selection logic 351, pulse logic 361, state logic 371, and mask 381 selectively provide the first power management event signal (PMU #1). Similarly, respective instances of selection logic, pulse logic, state logic, and masks provide additional power management event signals, an interval timer signal and a watchdog reset signal.

Focusing illustratively on the logic associated with a single timer event signal (illustratively, PMU #1 implementing a fixed disk controller power down event), selection logic 351 receives both an event descriptor (from configuration registers 210) and the bit outputs 206 of counter 230. The event descriptor received from configuration registers 210 identifies a particular state or states in the sequence supplied at the bit outputs 206 for which a PMU #1 (fixed disk controller power down) event may be selectively triggered. Although alternative embodiments may provide for more sophisticated selection criteria, the exemplary embodiment of selection logic 351 is implemented as a multiplexer selective for a particular one of the bit outputs 206 of counter plary computer system 100 may independently transition between power management modes under the control of a power management unit, such as 143. Alternatively, a system-wide set of power management modes may be implemented by power management unit 143. In such a case, the definition of a particular power management may differ for each subsystem of exemplary computer system 100. For example, ready, doze, standby and suspend modes may be defined for individual subsystems as shown in Table 1. Suitable designs for power management units, programmable interrupt controllers, and interrupt service routines are well known in the art. Power management unit 143, programmable interrupt controller 146, and any interrupt service routines triggered thereby are of any such suitable design. Mask 381 also receives a disable signal from configuration registers 210 for selectively disabling the associated event signal (i.e., PMU #1).

TABLE 1

|  | CPUCLK | SYSCLK | MEMCLK2 | PM Bus | CLK14 | Refresh source | Thermal Mgmt. |
|---|---|---|---|---|---|---|---|
| IP_Ready | Fast/ Medium | Fast/ Medium | Fast | Fast/ Medium | On | Timer | On |
| IP_Doze | Managed | Slow | Fast | Slow | On | Timer | Off |
| IP_Standby | Stopped | Slow | Fast | Slow | On | Timer | Off |
| IP_Suspend | Stopped | Stopped | Stopped | SCLK | Stopped | SCLK | Off |

Notes
Fast = full speed operation.
Medium = medium speed operation.
Slow = slow speed operation.
Stopped = Clock is gated off in clock generator. Oscillators may be stopped.

230. Accordingly, the associated event descriptor need only select the relevant bit output and may be implemented as a 16-bit mask. In the exemplary embodiment, the bit output selected by selection logic 351 is supplied to masking logic portion 344 via pulse logic 361. Pulse logic 361 forms a pulse triggered by the rising (or falling) edge of the selected bit output which is then selectively supplied by masking logic portion 344 as PMU #1. Those skilled in the art will recognize that alternative implementations may eliminate or relocate the functionality of pulse logic.

Masking logic portion 344 is depicted illustratively as instances of state logic and masks, illustratively, state logic 371 and mask 381. State logic 371 implements a state machine for supplying an enable signal to mask 381 on receipt of M pulses from pulse logic 361. The count, M, is determined by an associated control register field in configuration registers 210. Accordingly, the Mth pulse supplied by pulse logic 361 is passed by mask 381 as PMU #1. In the exemplary embodiment, configuration registers 210 and state logic instances (such as state logic 371) are closely coupled and each state logic instance decrements an associated count field in configuration registers 210. In this way, system software may periodically reset count fields in configuration registers 210, thereby staving off the associated timer event. Alternative embodiments for providing count reset are also suitable.

Power management unit 143 (and optionally, programmable interrupt controller 146) receives the PMU #1 and implements the fixed disk controller power down event. Individual power management event signals (PMU #1–PMU #N) trigger transitions between various power management modes, e.g., ready mode, doze mode, standby mode and suspend mode. Individual subsystems of exem- Focusing on the operation of timer event control logic 240, system software running on a processor such as processor 141 (shown in FIG. 1) writes to configuration registers 210 via system bus 144 and bus interface unit 201. In this way, system software establishes the operating parameters for multiple timer events to be derived from the single sequence of states provided by free-running counter 230. The data written to configuration registers 210 control the particular output bit of free-running counter 230 associated with a timer event. Higher or lower order bits of counter 230 may be selected to vary the desired period for a given timer event. Data written to configuration registers 210 also controls the count, M, of pulses masked by the associated mask instance. By setting a count of 1, 2, or more, the event period provided by timer event control logic 240 can be made less sensitive to the nondeterministic "starting point" of an interval measured against the state of free-running counter 230.

Large numbers of independent timer events, including multiple power management mode transition events for multiple power-managed subsystems, can be implemented by replicating instances of selection logic (e.g., 351, 352, . . . ), pulse logic (e.g., 361, 362, . . . ), state logic (e.g., 371, 372, . . . ), and masks (e.g., 381, 382, . . . ) and by providing system software for initializing and periodically resetting values in configuration registers 210. Interval timer events can be implemented similarly. System software need only set the associated event descriptor to select the triggering output bit of counter 230. An associated count value (and periodic reset thereof) is unnecessary to configure an output of timer event control logic 240 as an interval timer. However, because the value of counter 230 is nondetermistic, an initial count of one may be desirable to ensure that the interval timer event is not immediately generated. In this way, the first of a periodic sequence of interval timer events will be generated after an initial delay such that:

$$\text{interval} \leq \text{delay} \leq 2*\text{interval}$$

wherein the period for subsequent interval timer events is interval. Because watchdog reset, interval timer and power management mode transition signals are not particularly sensitive to some amount of variation in associated event periods, the pulse counting approach of timer event control logic 240 is a suitable design expedient. Alternate embodiments for systems implementing event signals more sensitive to the precise event periods provided may incorporate more sophisticated selection logic.

While the invention has been described with reference to various embodiments, it will be understood that these embodiments are illustrative and that the scope of the invention is not limited to them. Many variations, modifications, additions, and improvements of the embodiments described are possible. Those skilled in the art will recognize that boundaries between logic blocks are merely illustrative and that alternative embodiments may merge logic blocks or impose an alternate decomposition of functionality for timer event control logic 240. Indeed, state logic and mask instances (illustratively, 371 and 381) may be merged and implemented as a shift register. Moreover, alternative embodiments may combine multiple instances of a particular component. For example, individual instances of selection logic (illustratively, 351, 352, etc.) may be implemented as a single block. Alternative embodiments may also provide a gray code counter, a ripple counter, or another N-bit state machine in place of a binary counter. Corresponding modifications to state detection logic portion 342 will be apparent to those skilled in the art. Furthermore, the timer events described herein are merely illustrative and a variety of additional and/or alternative event signals may be analogously provided in accordance with the present invention. These and other variations, modifications, additions, and improvements may fall within the scope of the invention as defined in the claims which follow.

What is claimed is:

1. A timer circuit for supplying a plurality of time-based event signals from a single sequence of states, the timer circuit comprising:
    sequential logic having a clock input and a plurality of bit outputs, the sequential logic supplying a sequence of states at the bit outputs in response to a clock signal received at the clock input;
    first and second configuration registers;
    timer event control logic having a plurality of inputs respectively coupled to the bit outputs of the sequential logic and having first and second event outputs, the timer event control logic coupled to the first and second configuration registers to receive first and second event descriptors selective for corresponding first and second states in the sequence of states supplied at the bit outputs of the sequential logic, wherein a first event signal is selectively supplied at the first event output when the first event descriptor matches the state supplied at the bit outputs of the sequential logic, and wherein a second event signal is selectively supplied at the second event output when the second event descriptor matches the state supplied at the bit outputs of the sequential logic.

2. A timer circuit as recited in claim 1 wherein the sequential logic comprises a free-running binary counter.

3. A timer circuit as recited in claim 1 wherein the sequential logic comprises a free-running ripple counter.

4. A timer circuit as recited in claim 1 wherein the sequential logic comprises a free-running gray code counter.

5. A timer circuit as recited in claim 1 wherein the timer event control logic comprises:
    state detection logic coupled to the bit outputs of the sequential logic and coupled to the first and second configuration registers to receive the first and second event descriptors, the state detection logic supplying a first state detection signal when the bit outputs of the sequential logic correspond to the first event descriptor and supplying a second state detection signal when the bit outputs of the sequential logic correspond to the second event descriptor;
    masking logic coupled to the state detection logic to receive the first and second state detection signals, the masking logic selectively masking a first count of successive first state detection signals and thereafter supplying the first event signal in response to a subsequent one of the first state detection signals, the masking logic also selectively masking a second count of successive second state detection signals and thereafter supplying the second event signal in response to a subsequent one of the second state detection signals.

6. A timer circuit as recited in claim 5:
    wherein the sequential logic comprises a free-running counter having a plurality of bit outputs;
    wherein the state detection logic comprises first and second selection logic each coupled to the bit outputs of the free-running counter and respectively coupled to the first and second configuration registers to respectively receive the first and second event descriptors;
    wherein the first and second event descriptors are selective for particular ones of the bit outputs; and
    wherein first and second selection logic are coupled to the masking logic to respectively supply particular ones of the bit outputs as the first and second state detection signals, respectively.

7. A timer circuit as recited in claim 6, wherein the first and second selection logic each comprise multiplexed logic having control terminals respectively coupled to receive the first and second event descriptors, and wherein the first and second event descriptors are each selective for a particular one of the bit outputs.

8. A timer circuit as recited in claim 6, wherein the state selection logic further comprises first and second pulse logic respectively coupled between the first and second selection logic and the masking logic to respectively provide the first and second state detection signals as pulses.

9. A timer circuit as recited in claim 5 wherein the first event signal comprises a first power management signal and the second event signal comprises a second power management signal.

10. A timer circuit as recited in claim 9:
    wherein the first power management signal triggers a first power management level in a first subsystem of an electronic device; and
    wherein the second power management signal triggers a second power management level in a second subsystem of the electronic device.

11. A timer circuit as recited in claim 10 wherein the first and the second power management levels are each selected from the set of full performance, low performance (gated clock), sleep/doze, and full suspend.

12. A timer circuit as recited in claim 9:

wherein the first power management signal triggers a first power management level in a first subsystem of an electronic device; and wherein the second power management signal triggers a second power management level in the first subsystem of the electronic device.

13. A timer circuit as recited in claim 12 wherein the first and the second power management levels are each selected from the set of full performance, low performance (gated clock), sleep/doze, and full suspend.

14. A timer circuit as recited in claim 5 wherein the first and second event signals are independently selected from a set of event signal types including a watchdog reset signal, a first interval timer signal, a second interval timer signal, a first power management signal, and a second power management signal; and wherein the first and second event descriptors and the first and second counts are selected to provide a desired event interval for each selected event signal type.

15. A timer circuit as recited in claim 5 wherein the masking logic comprises:

first event count logic coupled between the state detection logic and a first event signaling port, the first event count logic coupled to the first configuration register to receive the first count of successive first state detection signals to be masked and to receive a first count reset signal;

second event count logic coupled between the state detection logic and a second event signaling port, the second event count logic coupled to the second configuration register to receive the second count of successive second state detection signals to be masked and to receive a second count reset signal.

16. A timer circuit as recited in claim 15 wherein the first and the second configuration registers are writable by software and are respectively coupled to the first and the second event count logic;

wherein a write to a portion of the first configuration register resets the first count logic; and wherein a write to a portion of the second configuration register resets the second count logic.

17. A timer for a power management system for first and second subsystems of an electronic device, the integrated timer comprising:

free-running counter means for supplying a sequence of states represented at a plurality of outputs;

event detection means for supplying first and second event detection indications corresponding to first and second detected states from the sequence of states, the event detection means coupled to the outputs of the free-running counter means and selective for particular ones of the outputs of the free-running counter means in accordance with first and second configuration data;

event masking means coupled to the event detection means for receiving first and second event detection indications, the event masking means selectively masking a first count of successive first event detection indications and thereafter passing the next of the first event detection indications to a power management unit for the first subsystem, the event masking means also selectively masking a second count of successive second event detection indications and thereafter passing the next of the second event detection indications to a power management unit for the second subsystem.

18. A method for supplying multiple time-based signals from a single sequence of states, the method comprising the steps of:

respectively loading first and second configuration registers with first and second event descriptors and with first and second event counts;

continuously incrementing a free-running counter to provide a single sequence of states;

detecting first and second event signals in the sequence of states, the first and second events corresponding to the first and second event descriptors, respectively;

masking a first number of successive first event signals;

masking a second number of successive second event signals; and supplying unmasked ones of the first and second event signals as first and second time based event signals.

19. A method, as recited in claim 18, wherein the first and second event descriptors are each selective for an individual output bit of the free-running counter, and wherein the detecting step includes the steps of:

selecting a first and a second output bit of the free-running counter in accordance with the first and second event descriptors; and providing the first and second output bits selected in the selecting step as the first and second event signals.

\* \* \* \* \*